Apr. 3, 1923.
R. GOLDSCHMIDT
FLEXIBLE SHAFTING
Filed July 16, 1921
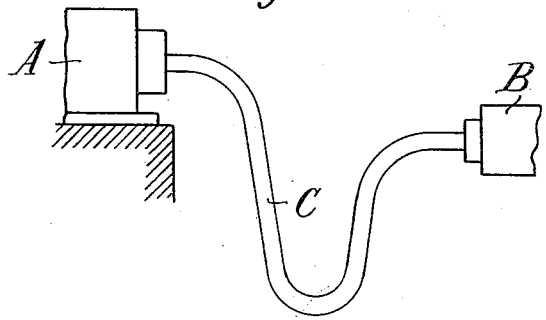
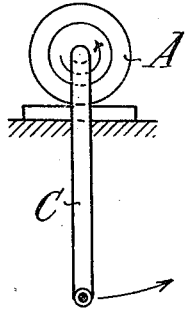
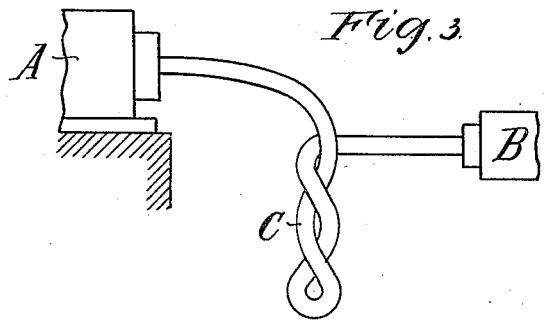
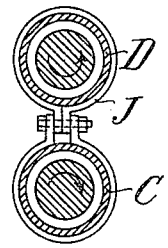
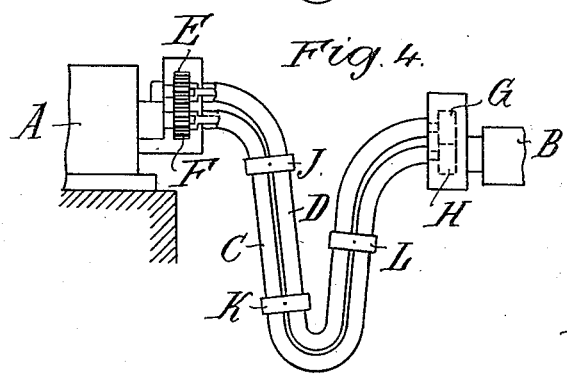
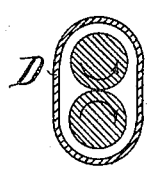
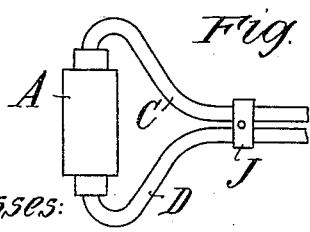
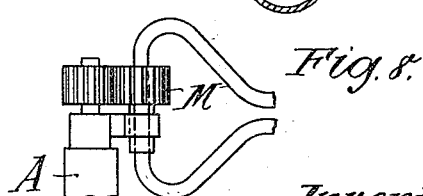
Witnesses:
Emil Kayser
Robert Schaper
Inventor:
Rudolf Goldschmidt
by: Watson, Coit,
Morse & Grindle,
Attorneys.

Patented Apr. 3, 1923.

1,450,284

UNITED STATES PATENT OFFICE.

RUDOLF GOLDSCHMIDT, OF BERLIN, GERMANY, ASSIGNOR TO DET TEKNISKE FORSØGSAKTIESELSKAB, OF ORDRUP, CHARLOTTENLUND, DENMARK, A COMPANY OF DENMARK.

FLEXIBLE SHAFTING.

Application filed July 16, 1921. Serial No. 485,375.

*To all whom it may concern:*

Be it known that I, RUDOLF GOLDSCHMIDT, a citizen of Germany, and a resident of Berlin, Germany, have invented certain new and useful Improvements in Flexible Shafting, of which the following is a specification.

This invention relates to high-speed power transmission by flexible shafting and has for its object to prevent the twisting or entanglement of the shafting which is frequently met with owing to the twisting of the shafting upon itself.

According to the present invention the flexible shafting comprises a pair of flexible shafts connected side-by-side and adapted to be driven in opposite directions and means for binding the coverings of said shafts together, so that any tendency of one shaft to twist upon itself is neutralized by the tendency of the other shaft to twist upon itself in the opposite direction.

In order that the invention may be more clearly understood reference is hereinafter made to the accompanying explanatory drawings whereon:—

Fig. 1 is a side view showing any ordinary form of flexible shaft connecting a prime mover A and driving member B.

Fig. 2 is a view at right angles thereto taken in section through the loop of the shaft.

Fig. 3 is a side view corresponding to Fig. 1 showing how the shafting twists upon itself.

Fig. 4 illustrates in side view one construction of the improved flexible shafting according to the present invention.

Fig. 5 is a cross section through the shafting showing a connecting clip.

Fig. 6 is a view corresponding to Fig. 5 showing a modified form of clip.

Fig. 7 is a fragmentary view showing an alternative means for driving the pairs of shafts in opposite directions.

Fig. 8 is a view corresponding to Fig. 7 showing a modification thereof.

Referring to Figs. 1, 2 and 3 which show any ordinary form of flexible shafting, the tendency of the shafting C to twist upon itself is due to the fact that the turning moment of the motor A upon the flexible shafting not only results in rotation of the flexible shafting C about its geometric axis, but also causes the depending loop to turn as a whole about its centre as may be readily seen from Fig. 2.

Heretofore in order to overcome this tendency of the shafting to twist, it has been usual to enclose the shafting in either rigid coverings or to stiffen the covering at intervals. Consequently the shafting is heavy and inconvenient to handle. In addition its flexibility is somewhat affected.

Fig. 4 shows such an arrangement according to the present invention in which a flexible shaft C, similar to the shaft C of Figs. 1, 2 and 3 is connected side-by-side with a second flexible shaft D, the two shafts being geared together by gearing E, F and G, H, so that the shaft D will be driven from the shaft C in the opposite direction thereto. If the two shafts then possess equal flexibility the power will be equally divided between the two shafts and the turning moments thereof will be equal but oppositely directed. It will of course be understood that the motor A, instead of transmitting motion to the gear wheel F as shown on the drawing, may transmit motion firstly to the gear wheel E or to both gear wheels in equal proportion and that the same remarks apply to the transmission of power from the gear wheels G, H. In Fig. 4 conjoint transmission of power from the flexible shafts is obtained by connecting the gear wheel H up to the member B to be driven.

The shaft coverings are preferably connected together by means of clips J such that the flexibility of the shafts will be only very slightly affected, the clips J being located at such intervals apart as to prevent twisting of the lengths of shafting between them. Fig. 5 shows one arrangement of clips J and Fig. 6 shows an alternative arrangement in which the shafts are enclosed in a single shaft covering K so that the two shafts form a single unit.

Instead of employing spur gearing for transmitting motion to or obtaining transmission of power from the shafts as in Fig. 4, an arrangement such as that illustrated in Fig. 7 may be employed in which the shaft of the motor A is connected at both ends to each of the flexible shafts C, D, the motor A being interposed midway in a loop formed between the two shafts.

Fig. 8 shows a further modification in which the shafts are looped together and a gear wheel M mounted midway in said loop, the gear wheel M being driven from the motor A. It will of course be understood that the other end of the shafts from which power is transmitted may be arranged in similar manner to Figs. 7 and 8.

Claims:

1. High-speed power transmission mechanism comprising a pair of parallel oppositely-rotated flexible shafts, a covering for each of said shafts and means for binding said coverings together to prevent twisting of said shafts.

2. High-speed power transmission mechanism as specified in claim 1 in which the coverings are bound together by clips located at such intervals apart as to prevent twisting of the lengths of shafting between them.

3. High-speed power transmission mechanism as specified in claim 1 in which the two flexible shafts are looped together at one end to form a continuous flexible shaft and a driving member mounted midway in the loop of the flexible shaft.

In testimony whereof I hereunto affix my signature.

RUDOLF GOLDSCHMIDT.